United States Patent [19]
Hochhausl

[11] Patent Number: 6,030,126
[45] Date of Patent: Feb. 29, 2000

[54] TWO AXIS TRACK ROLLER

[76] Inventor: Alexander Erich Hochhausl, 29 Wedgewood Dr., Coram, N.Y. 11727

[21] Appl. No.: 09/243,735

[22] Filed: Feb. 1, 1999

[51] Int. Cl.$^7$ ....................................................... F16C 19/00
[52] U.S. Cl. ............................... 384/266; 384/53; 384/56; 384/126; 105/180
[58] Field of Search .................................. 384/50, 53, 56, 384/57, 58, 59, 126, 127, 906, 537, 585; 301/5.23; 295/1; 105/127, 180

[56] References Cited

U.S. PATENT DOCUMENTS 2,444,432  7/1948  Eckert ........................................ 384/53

Primary Examiner—David A. Bucci
Assistant Examiner—Colby Hansen

[57] ABSTRACT

The Two Axis Track Roller is in the form of two sealed bearings mounted to a single stud which allows the device to carry loads in two dimensional axis. In this way the device can carry a load along a track as well as guide along a track wall. When used in pairs the device can be "pre-loaded" which allows for precise guiding of linear motion. The conventional bearing used provide internal balls and rollers which ride on their internal precision ground and hardened surfaces. The external bearing surfaces thus can ride on non hardened track surfaces whose precision is dictated only by the application requirements. Since the bearings are sealed the bearing balls and rollers do not come in contact with environmental contaminants so bearing life is increased.

3 Claims, 1 Drawing Sheet

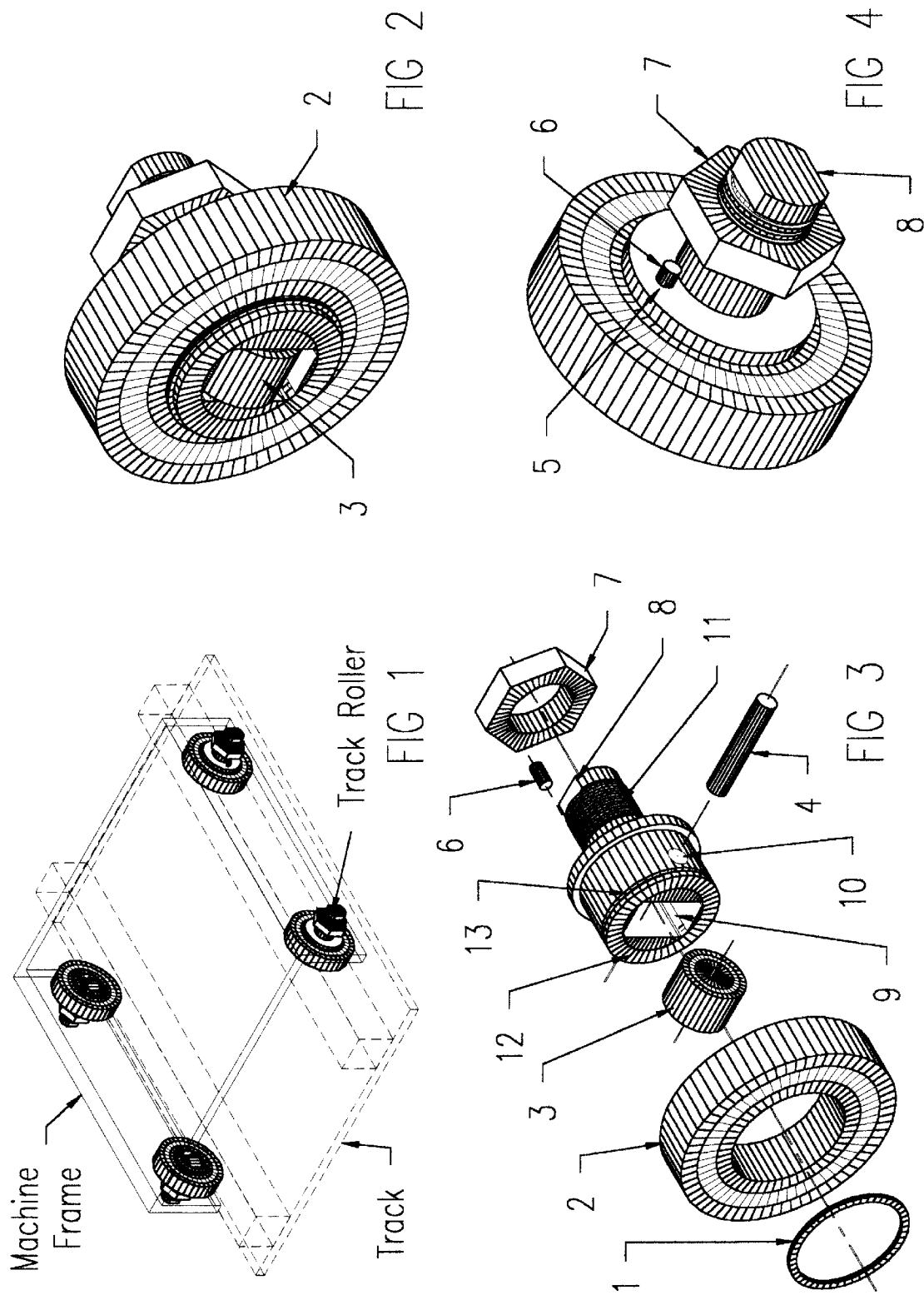

TWO AXIS TRACK ROLLER

BACKGROUND

In the field of industrial machinery design there is often a need for precise linear motion. There are devices currently available to achieve this motion. These devices are mostly in the form of linear bearings which ride on a precision machined surface of either a round or other profile rail. In these devices, the ball bearings responsible for the motion are in direct contact with the rail. Thus the rails needs to be precision ground and hardened. This device also is very sensitive to environmental contaminants on the rail surface since the ball bearings ride directly on the surface. Even where seals are used, they wear quickly leading to accelerated bearing failure.

Another device, usually called a track roller or cam follower, is in the form of a sealed bearing mounted to a stud which can carry a load in one dimensional axis only.

This invention termed "Two Axis Track Roller" is in the form of two sealed bearings mounted to a single stud which allows the device to carry loads in two dimensional axis. In this way the device can carry a load along a track as well as guide along a track wall. When used in pairs the device can be "pre-loaded" which allows for precise guiding of linear motion. The conventional bearing used provides internal balls and rollers which ride on their internal precision ground and hardened surfaces. The external bearing surfaces thus can ride on non hardened track surfaces whose precision is dictated only by the application requirements. Since the bearings are sealed the bearing balls and rollers do not come in contact with environmental contaminants so bearing life is increased.

SUMMARY OF INVENTION

This invention consists of a stud onto which two sealed bearings are mounted. The stud in turn is mounted to a machine frame to provide it with linear motion. The first bearing is a conventional "yoke" type cam follower bearing. It's purpose is to provide the guiding function. It is mounted to a shaft which is fit into the a machined pocket of the mounting stud of the second bearing. The guide bearing outer diameter protrudes far enough for it to clear the mounting stud of the second bearing. The second bearing can be a conventional ball, roller, or tapered roller bearing. It is mounted onto the stud and retained with an external retaining ring. The opposite side of the bearing stud features a flange and a threaded stud used to mount the entire assembly to the machine component. The flange features a locating pin which extends out perpendicular to the flange face and is meant to mate with a hole drilled in the machine frame to keep the roller stud from rotating.

BRIEF DESCRIPTION OF DRAWING VIEWS

FIG. 1 Sample application of the Two axis track roller to illustrate the component functions.

FIG. 2 Two axis track roller shown in it's assembled form from a front isometric view.

FIG. 3 Two axis track roller shown in it's assembled form from a rear isometric view.

FIG. 4 Two axis track roller individual components shown as an assembly drawing.

DETAILED DESCRIPTION

FIG. 1 illustrates a sample application of the Two axis track roller. Refer to FIG. 3 for item and feature designators. The conventional yoke type cam follower, item 3, carries the guiding rolling force. The conventional bearing, item 2, carries the load force. The roller is mounted to the machine frame via the threaded stud, feature 11, and nut, item 7. The pin, item 6, fits into a bore of the machine frame and keeps the stud, item 12, from rotating. The machined flats, feature 8, on the threaded stud, item 12, can be used to hold the stud and to provide alignment when installing the stud into the machine frame.

FIG. 2 points out the guide bearing, item 3 and the load carrying bearing, item 2, of the Two axis track roller.

FIG. 3 shows the location of the stud mounting flange, feature 5, and the locating pin, item 6. The threaded stud, feature 11, incorporates the machined flats, feature 8, used to hold and align the roller for installation. The nut, item 7, is used to fasten the stud into the machine frame.

FIG. 4 shows the individual roller components. Typical assembly is as follows. The conventional yoke cam follower, item 3, is mounted into the pocket, feature 9, of stud, item 12 by pressing the shaft, item 4, through the holes, feature 10, of the stud, item 12. The conventional bearing, item 2, is pressed onto the stud, item 12, and a conventional retaining ring, item 1, is installed into the groove, feature 13, on stud, item 12. The locating pin, item 6, is pressed into a hole on the mounting flange, feature 5. The threaded nut, item 7, is threaded onto the threaded stud, feature 11, when roller assembly is installed into the machine frame.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of this invention, as set forth in the following claims.

I claim:

1. A track roller capable of carrying forces in two dimensional axes comprising: two sealed bearings mounted to a single stud frame, the first bearing located on the outside surface of the stud frame, and the second bearing located on the inside of the stud frame, said second bearing having an axis of rotation horizontally perpendicular to said first bearing;

the stud frame further comprising a locating pin that fits into a bore of a machine frame thus preventing the stud frame from rotating.

2. A track roller as defined in claim 1 which contains a pocket in the stud frame to house said second bearing.

3. A track roller as defined in claim 2 in which said second bearing is retained by a shaft pressed through the stud frame and through the pocket.

* * * * *